United States Patent [19]

Norton

[11] Patent Number: 4,982,664
[45] Date of Patent: Jan. 8, 1991

[54] CRASH SENSOR WITH SNAP DISK RELEASE MECHANISM FOR STABBING PRIMER

[76] Inventor: Peter Norton, 1 S. Lakeside, Lake Hopatcong, N.J. 07849

[21] Appl. No.: 527,643

[22] Filed: May 23, 1990

Related U.S. Application Data

[63] Continuation of Ser. No. 147,190, Jan. 22, 1988, abandoned.

[51] Int. Cl.$^5$ .............................................. F42C 1/04
[52] U.S. Cl. ...................................... 102/272; 73/514; 180/282
[58] Field of Search ................... 280/734; 180/282; 102/247, 275, 274, 252, 253, 254, 272; 200/61.53, 61.45 R, 61.45 M, 61.48, 61.50; 73/514; 116/203; 60/635, 636

[56] References Cited

U.S. PATENT DOCUMENTS

| | | | |
|---|---|---|---|
| 2,857,842 | 10/1958 | Malm | 102/274 |
| 3,493,701 | 2/1970 | Clarke | 200/61.53 |
| 3,703,102 | 11/1972 | Prachar | 73/514 |
| 3,768,832 | 10/1973 | Schmidt | 200/61.53 |
| 4,092,926 | 6/1978 | Bell | 73/514 |
| 4,161,228 | 7/1979 | Svensson et al. | 280/734 |
| 4,915,411 | 4/1990 | Norton | 280/734 |

*Primary Examiner*—Charles A. Marmor
*Assistant Examiner*—Karin Tyson
*Attorney, Agent, or Firm*—Reising, Ethington, Barnard, Perry & Milton

[57] ABSTRACT

A crash sensor for automobiles of the type including a ball moving against viscous damping in a closed cylinder for releasing a firing pin for initiating a pyrotechnic sequence has an improved release mechanism. When the ball moves a predetermined distance from its normal or resting position during an automobile crash it initiates a cascade of releases of increasingly larger and more powerful snap disks. The firing pin is mounted on and driven by the largest snap disk.

4 Claims, 2 Drawing Sheets

CRASH SENSOR WITH SNAP DISK RELEASE MECHANISM FOR STABBING PRIMER

This application is a continuation of application Ser. No. 147,190, filed Jan. 22, 1988 now abandoned.

FIELD OF THE INVENTION

This invention relates to mechanisms of the type that drive a firing pin into a stab primer upon frontal collision of an automobile thereby initiating deployment of an air bag.

BACKGROUND OF THE INVENTION

Air bags are inflatable bags that remain folded and out of sight in readiness for a frontal collision. During a collision, chemical reaction of a material typically containing sodium azide produces gaseous products which inflate the bag and interpose it between the driver and the steering wheel or the front seat occupant and the dashboard.

A sensor of the type to which this invention is applicable is marketed by Breed Automotive Corp. It has a metallic ball free to move in a sealed cylinder. Air flow around the ball causes a pressure differential. The pressure differential causes a force proportional to and opposite the relative velocity of the ball with respect to the cylinder. The proportionality of force to velocity makes the sensor an acceleration integrator that initiates a chemical reaction upon achievement of a predetermined velocity change. The variation of air viscosity with temperature is compensated by making the cylinder and ball of materials of different thermal expansion coefficients thereby causing the gap between the ball and cylinder to change with temperature as required to maintain the performance of the sensor over a wide temperature range. A firing mechanism for initiating combustion of a stab primer includes a pin propelled by a first spring into the stab primer. A release means for the firing mechanism includes a trigger in the form of a metal rod extending perpendicular to a pivoted shaft having a "D" shaped cross section. The trigger is moved by the ball to its firing position during a crash. A second spring urges the trigger away from the firing position thereby causing the trigger to maintain the ball in a normal or resting position during normal operation of the vehicle. The force the trigger applies to the ball modifies the pure velocity change character of the sensor so that the velocity change required for release of the firing pin increases with the duration of the deceleration pulse of the crash. Movement of the ball during a crash rotates the trigger until the flat portion of the D-shaft releases the firing pin which is thereupon driven by the spring into a stab primer. Ignition of the stab primer initiates combustion of larger amounts of propellent material that generates gas for filling the air bag. Two complete sensor and firing mechanisms are combined into one package to enhance reliability by providing two units each capable of initiating combustion of the propellant.

This sensor is expensive to manufacture and one reason for the high cost is the large number of complex parts and the precision required in the trigger mechanism. Great care is required to make each part so as to insure minimum friction and maximum precision during the life of the sensor.

A snap disk is a piece of spring material that has a normal relaxed shape which approximates a section of a sphere. In this shape its potential energy is at its lowest value. It is also in equilibrium, or will also remain indefinitely in a second shape in which it is dished in the opposite direction. In its second shape it has greater potential energy than in its normal relaxed shape and will energetically snap into its relaxed position when it is urged in that direction by force applied to its center.

A stab primer is a commercially available unit containing of a crystal that ignites when it is cracked. The crystal in sealed in a container having a cover plate positioned adjacent to a face of the crystal and designed to be pierced by a pointed object. Piercing the cover plate by a pin having sufficient energy ignites the crystal which initiates combustion of an ignition mix which in turn ignites the propellent material for producing gas for filling an air bag.

A general object of this invention is to provide a crash sensor for automotive vehicles which also overcomes certain disadvantages of the prior art.

SUMMARY OF THE INVENTION

The present invention provides a crash sensor of the type having a viscously damped ball movable in a sealed cylinder with means to initiate movement of a firing pin when the ball has reached a firing position. The invention discloses a system of the aforementioned type which is highly reliable, compact, light in weight, and economical to manufacture. The trigger mechanism is a novel design that minimizes the number of components and their manufacturing cost. A series of snap disks of increasing size terminates at a large and powerful snap disk that carries a firing pin. Initiating movement of the smallest snap disk begins a cascade ending with the movement of the largest snap disk and the firing pin toward a stab primer.

Further, in accordance with this invention, the components of the firing mechanism have only two stable positions. There is no intermediate state in which the snap disks can remain for any significant period of time.

Further, in accordance with this invention, there is no precision fitting of parts and all parts have circular symmetry thereby allowing use of inexpensive production methods.

Further, in accordance with this invention, the axial symmetry of the sensor and its components simplifies the manufacture because the components do not require rotational orientation during assembly.

Further, in accordance with this invention, the entire sensor and stabbing mechanism is a self contained unit having structural integrity. By contrast, known mechanical crash sensing and primer stabbing systems rely on the structure supporting the stab primer for structural integrity. Therefore, the two sensor and primer stabbing systems of the known system must be manufactured and assembled at the same time as each other and at the same time as the entire sensor. This has the disadvantage that the if there is an error or defect in manufacturing one of the two crash sensing and primer stabbing systems there is a higher than random probability that the same cause will affect the other of the two units. Two units of the design disclosed herein can be chosen from independently manufactured lots and combined in the same occupant protection system whereby the probability of system failure is reduced to a greater extent than if both units are manufactured simultaneously.

A complete understanding of this invention may be obtained from the description that follows taken with the accompanying drawings.

BEST MODE FOR CARRYING OUT THE INVENTION

Figure 1:
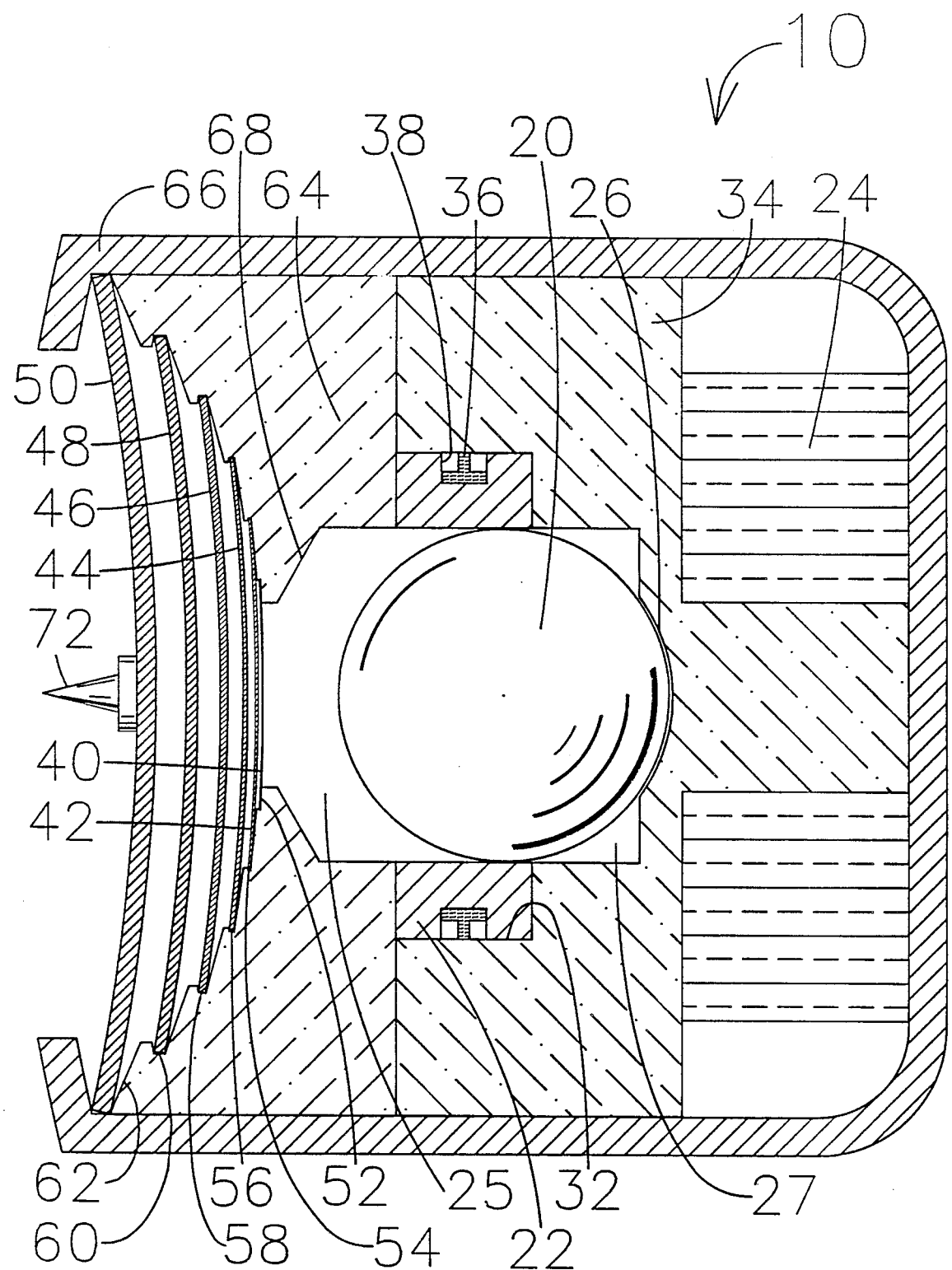
FIG. 1 shows a complete sensor of the invention with certain parts shown in section and the ball in its normal or resting position and the snap disks in their armed or higher energy position.

Referring now to the drawings, an illustrative embodiment of the invention is shown in a crash sensor 10. The crash sensor comprises a ball in a sealed cylinder for sensing a deceleration pulse indicative of a crash. During a crash the ball moves to a position where a firing mechanism is released. A firing pin is adapted for piercing a stab primer (not illustrated) for initiating a chemical reaction that generates gas that causes deployment of an air bag. It will be appreciated as the description proceeds that the invention may be implemented in different embodiments.

Figure 2:
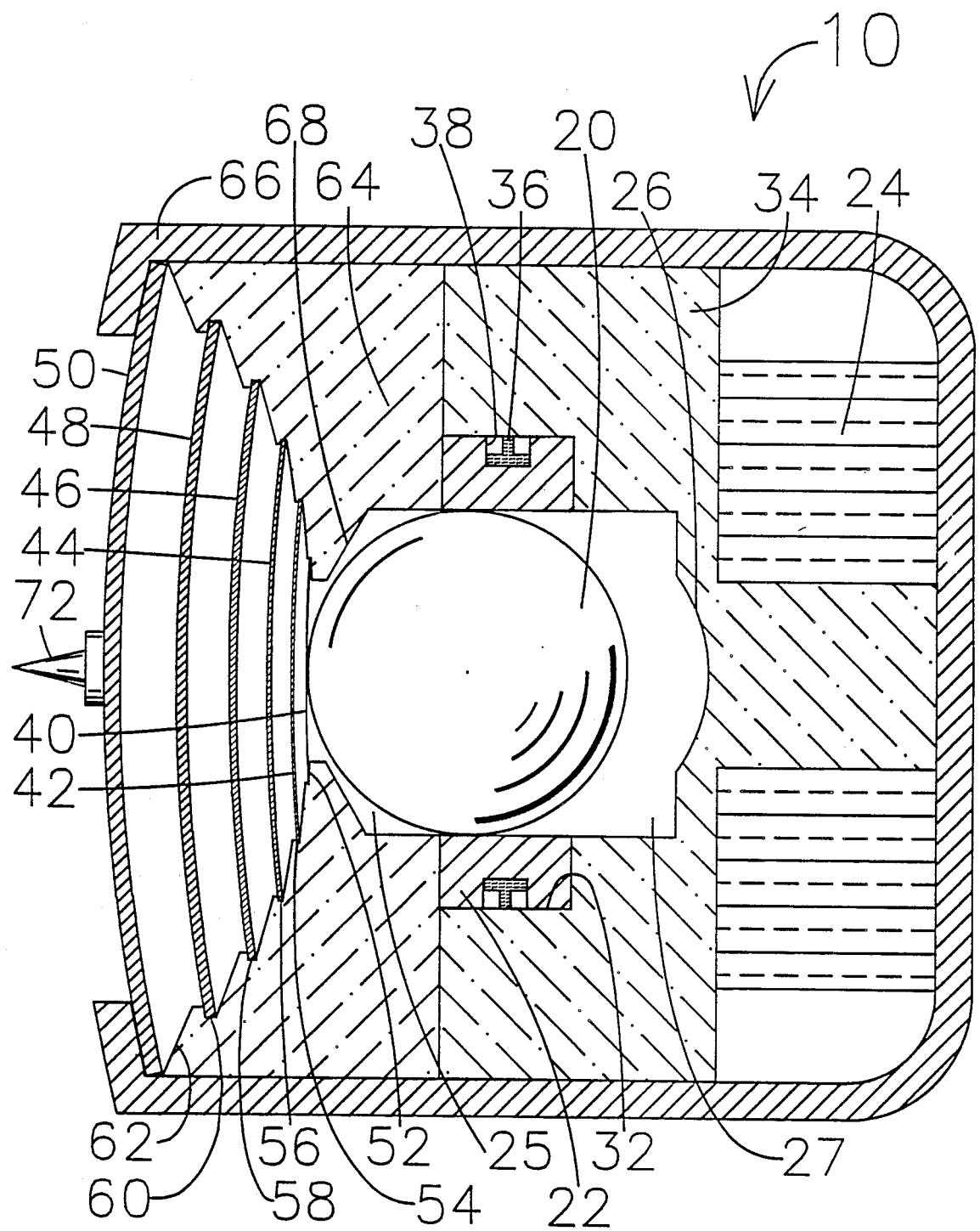
FIG. 2 shows the same sensor as FIG. 1 but with the ball and snap disks in their unarmed or lower potential energy positions.

Referring now to FIGS. 1 and 2, the crash sensor 10 comprises a ball 20 movable in cylinder 22. During normal operation of the vehicle magnet 24 holds the ball 20 against stop 26.

Cylinder 22 fits loosely in cavity 32 in cylinder housing 34. Sealing ring 36 in groove 38 of cylinder 22 prevents movement of air around cylinder 22 while allowing cylinder 22 to move slightly within cavity 32.

Snap disks 40, 42, 44, 46, 48, and 50 reside respectively in annular grooves 52, 54, 56, 58, 60 and a groove formed by the end 62 of collar 64 and outer housing 66. During manufacture each snap disk except the largest snap disk 50 is gripped around its circumference and compressed radially by the gripper and extended by the radial force applied by the gripper and by pressure applied near its center into greater curvature than shown in FIG. 1 and until its outer diameter is reduced sufficiently to allow it to be placed in its annular groove whereupon it is released. Vent holes in the snap disks 40, 42, 44, 46, 48, and 50 or other venting means (not illustrated) are provided to prevent pressure buildup from delaying the snapping movement. The set of snap disks just described constitutes a trigger means for the firing pin 72 and is operative to amplify the force which is applied to snap disk 40 and apply the amplified force to the pin 72.

The snap disks 40, 42, 44, 46, 48, and 50 are designed for energetically snapping to the positions illustrated in FIG. 2 in which they have their lowest potential energy from the positions illustrated in FIG. 1 in which they are in their higher potential energy equilibrium states. Firing pin 72 is attached to the center of snap disk 50. The entire assembly is held together by outer cylindrical housing 66 which also provides a flux path for the magnetic flux from magnet 24. Surface 68 of collar 64 limits the travel of ball 20 during a crash to a position which insures movement of the snap disks but prevents movement to a position which would dislodge snap disk 40 from its groove 52.

The operation of the invention will now be described with reference to FIGS. 1 and 2.

In operation of the system, ball 20 is normally urged against stop 26 by the magnetic force of magnet 24. When a deceleration much greater than one g is applied to the sensor, as would happen during an automobile crash, the inertia of the ball 20 causes it to move away from the stop 26 and toward the snap disks 40, 42, 44, 46, 48, and 50. For this movement to happen it is necessary for some of the air in chamber 25 to pass through the annular gap between ball 20 and cylinder 22 into the chamber 27. The movement of the air between the ball and cylinder is resisted by the viscosity of the air thereby causing a pressure differential with the pressure in chamber 25 being greater than the pressure in chamber 27. This pressure differential opposes the movement of ball 20 toward the snap disks so that ball 20 does not contact snap disk 40 and initiate its movement until a predetermined velocity change has occurred.

At lower ambient temperatures the clearance between ball 20 and cylinder 22 decreases because the thermal coefficient of expansion of the cylinder 22 is greater than that of the ball 20. This increases the viscous resistance to the movement of air through the annular gap and compensates for the reduced viscosity of air at lower temperatures. At higher temperatures the clearance increases thereby also compensating for the higher viscosity of air at higher temperatures. The diameters of the ball and cylinder bore are chosen so that the temperature compensation is correct for the materials of which the ball and cylinder are made.

The movement of ball 20 toward the snap disks is also resisted by the force of magnet 24. The force the magnet 24 applies to the ball 20 modifies the pure velocity change character of the sensor which was described in the preceding paragraph so that the velocity change required for release of the firing pin increases with the duration of the deceleration pulse of the crash.

When ball 20 contacts snap disk 40 a predetermined velocity change that warrants deployment of an air bag has occurred. The ball applies a force equal to several times its weight to snap disk 40 which thereupon snaps toward its relaxed position. When it has moved approximately one half of the distance to its relaxed position it contacts the center of snap disk 42. Snap disk 42 is larger and more powerful than snap disk 40 but is sufficiently sensitive that its movement can be reliably initiated by snap disk 40. This process repeats with snap disk 42 initiating the movement of snap disk 44, snap disk 44 initiating the movement of snap disk 46, snap disk 46 initiating the movement of snap disk 48, and finally snap disk 48 initiating the movement of snap disk 50 and firing pin 72.

When the crash sensor 10 is in the unarmed state illustrated in FIG. 2 it is armed by applying force to the center of snap disk 50 and moving it until first, snap disk 50 touches snap disk 48; second, snap disk 48 touches snap disk 46; third, snap disk 46 touches snap disk 44; fourth, snap disk 44 touches snap disk 42; and, finally, snap disk 42 touches snap disk 40 and urges it into its second state or state of higher energy. The positions of the disks in which all the disks are touching and snap disk 40 is in its state of higher energy is defined for future reference as the "resetting position". The force being applied to the center of snap disk 50 is then gradually relaxed to allow the snap disks to ease into the positions illustrated in FIG. 1.

A mechanism for preventing accidental firing when the system is not installed in a vehicle is normally included in complete systems of the type that would includes sensors 10. Sensor 10 can be made safe against accidental firing by incorporating a means in the complete system for holding snap disk 50 in the resetting position at those times that the system is not installed in a vehicle.

A complete occupant protection system preferably contains more than one of the crash sensors 10 with each sensor located adjacent its own stab primer. The complete system is designed so that any of the sensors can initiate deployment. This insures the high reliability required of the systems. In the preferred systems the reliability is further enhanced by selecting the sensors used in each system from different lots manufactured at times and under conditions as different from each other as feasible to minimize the likelihood of a common manufacturing defect appearing in all of the sensors of any one system.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A crash sensor comprising:
   trigger means for activating a firing pin for initiating a chemical reaction,
   a sensing mass movable from a normal resting position not contacting said trigger means to a firing position contacting said trigger means in response to deceleration during a crash,
   said trigger means including a sequence of snap disks for amplifying the force applied thereto by said sensing mass for activating said firing pin,
   a first snap disk of said sequence being adapted to respond to force exerted by said sensing mass by snapping from its state of higher energy equilibrium to its state of lower energy equilibrium and in doing so to initiate movement of a second snap disk in said sequence,
   a last snap disk of said sequence being adapted to respond to force exerted by a next to last snap disk by snapping from its state of higher energy equilibrium to its state of lower energy equilibrium and in doing so to drive said firing pin,
   any other snap disk of said sequence being adapted to respond to force exerted by the snap disk preceding it in said sequence by snapping from its state of higher energy equilibrium to its state of lower energy equilibrium and in doing so to initiate movement of the snap disk following it in said sequence,
   said first snap disk of said trigger means responding to the force exerted by said sensing mass only when said sensing mass reaches said firing position.

2. A crash sensor comprising:
   trigger means comprising a sequence of snap disks for activating a firing pin,
   a sensing mass movable from a normal resting position not contacting said trigger means to a firing position contacting said trigger means in response to deceleration during a crash,
   a first snap disk of said sequence being adapted to respond to force exerted by said sensing mass by snapping from its state of higher energy equilibrium to its state of lower energy equilibrium and in doing so to initiate movement of a second snap disk in said sequence,
   a last snap disk of said sequence being adapted to respond to force exerted by the next to last snap disk by snapping from its state of higher energy equilibrium to its state of lower energy equilibrium and in doing so to drive said firing pin,
   any other snap disk of said sequence being adapted to respond to force exerted by a snap disk preceding it in said sequence by snapping from its state of higher energy equilibrium to its state of lower energy equilibrium and in doing so to initiate movement of a snap disk following it in said sequence.

3. The invention as defined by claim 2 wherein said sensing mass is a ball movable in a cylinder.

4. The invention as defined by claim 2 wherein said sensor comprises a primer means adapted to be ignited by said firing pin and wherein two or more of said sensors are independently manufactured and are placed in proximity to a body of ignitable material, and wherein each of said primer means is by itself capable of igniting said body of ignitable material,
   thereby reducing the probability of the system failing to operate in the event of a crash.

* * * * *